Oct. 25, 1938.  A. EFRON  2,134,112
BOOKKEEPING DEVICE
Filed Oct. 22, 1937  2 Sheets-Sheet 1
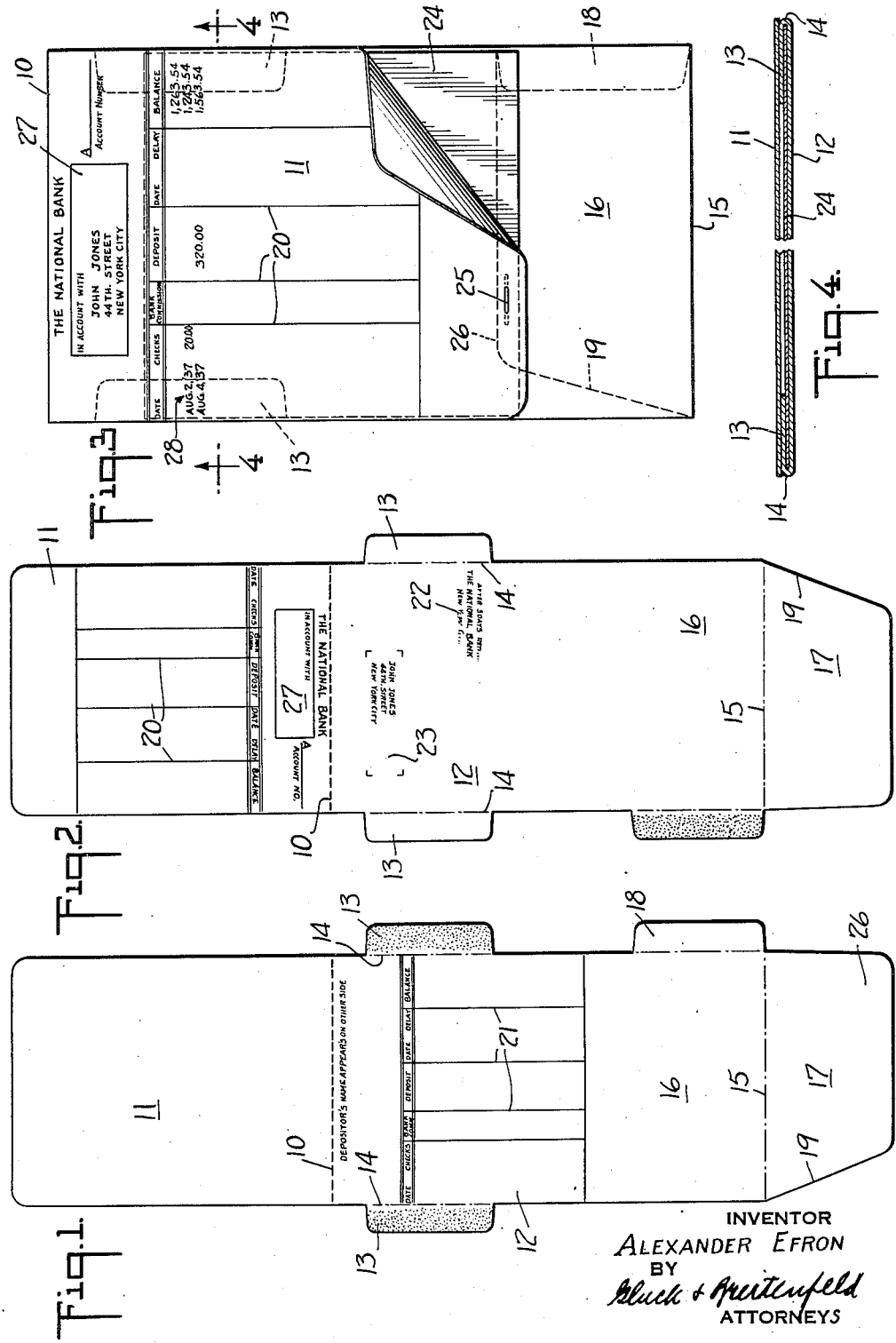
INVENTOR
ALEXANDER EFRON
BY
*Black + Breitenfeld*
ATTORNEYS Oct. 25, 1938.    A. EFRON    2,134,112
BOOKKEEPING DEVICE
Filed Oct. 22, 1937    2 Sheets-Sheet 2
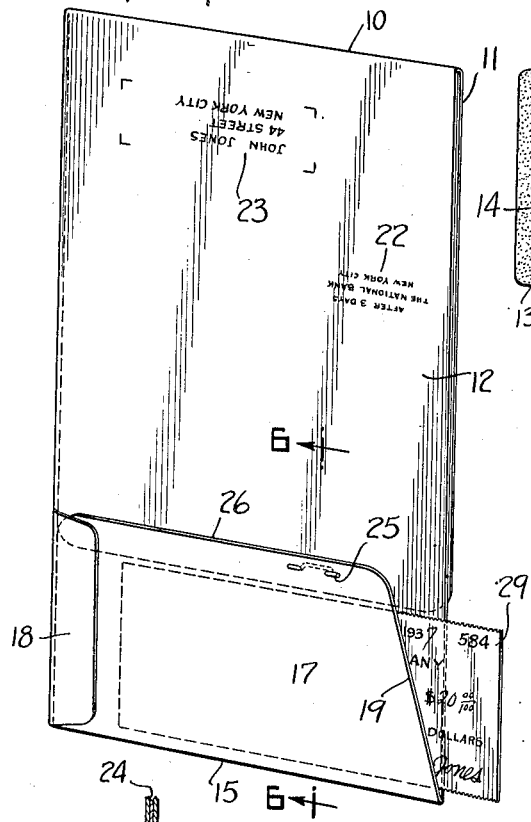
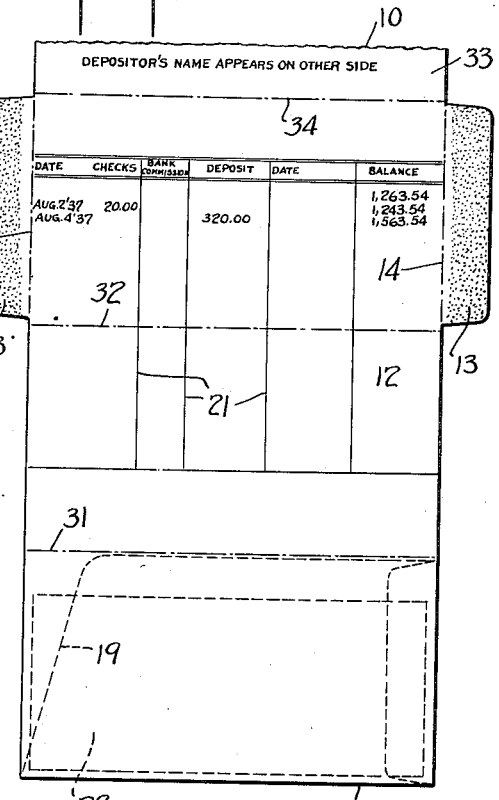
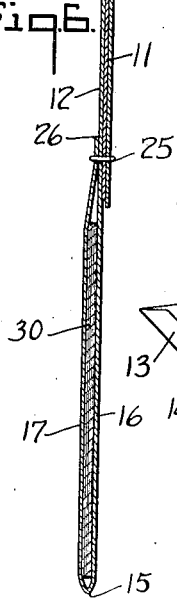
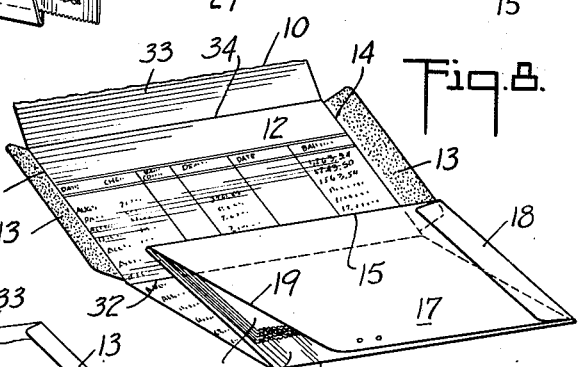
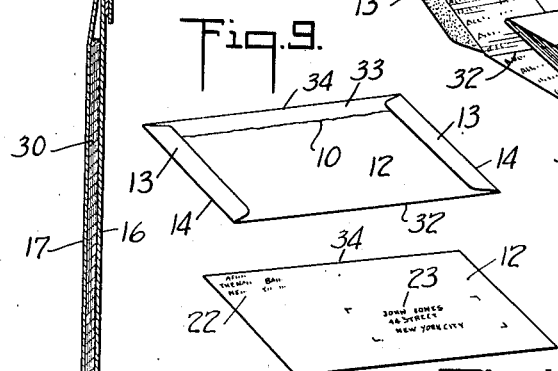
INVENTOR
ALEXANDER EFRON
BY
Black & Breitenfeld
ATTORNEYS Patented Oct. 25, 1938

2,134,112

UNITED STATES PATENT OFFICE 2,134,112

BOOKKEEPING DEVICE

Alexander Efron, New York, N. Y., assignor to Checkmaster Plan, Inc., New York, N. Y., a corporation of New York Application October 22, 1937, Serial No. 170,328

15 Claims. (Cl. 283—1)

My present invention relates generally to bookkeeping, and has particular reference to an improved device to be used in association therewith.

My invention has applicability to any situation in which a concern has a number of continuing transactions with customers, involving debit or credit entries, or both, on individual ledger pages, based on or related to corresponding vouchers which are ultimately to be submitted to the respective customers, along with statements of account. The relationship between a department store and its customers is a typical example. The transactions between a bank and its checking accounts is another example.

Merely by way of example, for the purpose of explaining the general nature of my invention, I have illustrated and shall hereinafter describe my device as it applies to the relationships between a bank and a customer having a checking account; but it will be understood that the invention is of wider applicability.

The bookkeeping steps which are involved between a bank and a checking account customer require, first, the opening of a ledger page or card for the particular customer. As checks are drawn by the customer and ultimately presented to the bank for payment, debit entries are made on the ledger page. As and when deposits are made, corresponding credit entries must be made. Periodically, it is customary and desirable to deliver to the customer a statement of his account, showing the transactions over a given period and showing the resultant balance in his account. At the same time, it is desirable that there be returned to the customer the cancelled checks or other vouchers upon which the debits and/or credits have been based. Usually, it is preferable to provide for this rendition of account and the return of vouchers through the mail.

Without describing in detail the particular procedures which are now resorted to by custom, I will state briefly that a series of operations are usually necessary which involve considerable labor and time in the making of entries on the ledger sheet, on the statement of account which is ultimately to be furnished to the customer, in the retention and sorting of vouchers, in the assembly of accumulated vouchers with the ultimate statement, and in the ultimate mailing procedure.

It is a general object of my present invention to provide a device for simplifying this entire procedure and for facilitating the necessary work in a manner which increases efficiency, minimizes the likelihood of error, and saves both time and labor.

One of the characterizing features of my invention lies in the provision of an arrangement whereby only a single posting of each transaction is required. This step is, by itself, not entirely new, but in accordance with my invention the voucher upon which each posted entry is based is physically retained in direct association with the ledger page and the statement of account at the time of the posting operation. Moreover, the ultimate assembly of the unit to be sent to the customer (consisting of the statement of account and the accumulated vouchers appertaining to the entries thereon), together with the ultimate mailing of this unit to the customer, is simplified to an unusually efficient degree. Moreover, my invention is characterized by the employment of a pair of separably associated, superposed sheets with a separable duplicating means sandwiched between them, together with a pocket adapted to accommodate vouchers. The upper sheet constitutes a ledger page, and the under sheet constitutes a statement of account, whereby entries made on the ledger page are immediately duplicated upon the statement of account; and the pocket is carried by the statement of account and accommodates the vouchers upon which such entries are based. As a result, the ultimate removal of the ledger page and the duplicating means automatically leaves an assembly consisting only of the statement of account and the vouchers appertaining to the entries thereon. This device is further characterized by the fact that the statement of account is physically large enough to enfold the pocket and the accommodated vouchers, thereby facilitating the formation of the ultimate mailing unit. In accordance with my invention, means are provided for permitting this assembly to serve as a self-sufficient mailable unit, requiring no extraneous envelope or container.

I achieve the foregoing objects, and such other objects as may hereinafter appear or be pointed out, in the manner illustratively exemplified in the accompanying drawings, wherein—

Figure 1 is a plan view showing one side of a blank from which the present device is formed;

Figure 2 is a plan view showing the other side;

Figure 3 is a plan view of the present device, fully assembled;

Figure 4 is an enlarged cross-sectional view taken substantially along the line 4—4 of Figure 3;

Figure 5 is a perspective view of the device of Figure 3, viewed from the rear;

Figure 6 is an enlarged cross-sectional view taken substantially along the line 6—6 of Figure 5;

Figure 7 is a view of the device after the ledger page and duplicating means have been removed therefrom;

Figure 8 is a perspective view showing the first step in transforming the assembly of Figure 7 into a mailable unit;

Figure 9 is a perspective view of the mailable unit, from the rear; and

Figure 10 is a perspective view of the obverse side of the unit of Figure 9.

In the illustrated embodiment, an elongated, substantially rectangular blank of paper or suitable equivalent material is first provided with the transverse score line 10 forming the flap portion 11 which is adapted to be folded down along the score line 10 onto the medial portion 12. At the lateral edges of the portion 12, relatively near the score line 10, are the sealing flaps 13 which are normally folded over onto the portion 12 along the fold lines 14.

Below the portion 12 the blank is divided by a fold line 15 into the two portions 16 and 17, the portion 16 carrying a lateral sealing flap 18 and the portion 17 having an oblique cutaway lateral edge 19.

On the portion 12, suitable indicia are arranged to constitute a statement of account. I have illustratively shown a series of vertical columns on which successive entries may be made relating to the date of a transaction, the amount of a draft or deposit, the amount of the bank fee or commission, if any, the resultant balance, etc.

On the reverse side of the portion 11 I provide similar indicia to constitute a ledger page or record. These indicia, designated by the reference numeral 20, are so positioned that when the portion 11 is folded down over the portion 12, as shown in Figure 3, the indicia 20 will be accurately superposed on the corresponding indicia on the statement of account, designated generally by the reference numeral 21.

The reverse side of the statement of account 12, in the region between the sealing flaps 13, is ultimately to constitute the obverse face of a mailing unit; and with this objective in view, the name and address of the bank (or other concern) is preferably in the region designated by the reference numeral 22; and in the region 23 a space is reserved for permitting the bank (or other concern) ultimately to type in the name and address of the customer.

The blank of Figures 1 and 2 is preferably constructed in one piece, as shown, and it will be observed that its manufacture and production are a relatively simple matter, it being understood that the indicia 20 and 21 and such other material as may be desirable, are preferably placed thereon by printing.

In assembling the device, preparatory to its employment in the bookkeeping system, the blank is folded along the score line 10 to position the portion 11 directly over the portion 12, as shown in Figure 3. Between these sheets, a duplicating means 24 is inserted, preferably in the form of a conventional piece of carbon paper. The sheet 24 is held in separable sandwiched relation by the turned-in flaps 13 and by a special releasable means 25 which is preferably in the form of a removable wire staple. This staple extends through the ledger page, through the duplicating means 24, and through the statement of account 12, thereby serving also to hold the ledger page in proper superposed relation.

In the meantime, the portion 17 will have been folded back, along the line 15, so as to underlie the portion 16. The staple 25 extends also through the edge portion 26. The sealing flap 18 is folded down and secured in position by adhesive or the like, to hold the portions 16 and 17 in superposed relation. This produces a pocket having the front wall 16 and the rear wall 17, the pocket being closed at one edge by the fold line 15, at one end edge by the sealing flap 18, and at the opposite longitudinal edge by the temporary fastening means 25. The pocket is open at the end portion defined by the oblique edge 19.

This pocket may be said to be carried by the statement of account 12 and, in the preferred construction herein illustrated, the pocket is an integral portion of the statement of account since the front wall 16 is an integral extension of the statement of account 12. It will also be observed that, in the illustrated construction, the pocket is carried at the bottom of the statement of account in a sort of suspended relationship.

The device is now ready for use, and the bookkeeping device is used as follows:

As soon as an account is opened with a customer, his name and address are typed or stenciled into the region 23 and also into the region 27 on the ledger page.

As and when any transaction takes place and it becomes necessary to make an entry, the voucher appertaining to the transaction is furnished to the person whose duty it is to make the entry. With this voucher before him, he thereupon enters the transaction on the ledger page, the duplicating means 24 serving automatically to mark the identical entry on the statement of account which lies beneath it. Usually, the entries are made on a suitable typewriting machine, the entire device of Figure 3 being rolled into the machine in the customary manner. Assuming, for example, that the transaction involves a draft on a bank, by means of a check, an entry of the character shown at 28 is made, the resultant balance in the customer's account being immediately marked in the column designated "Balance". The check is thereupon forthwith inserted endwise into the pocket, as shown most clearly in Figures 5 and 7, in which I have applied the reference numeral 29 to the check. It will be understood, of course, that a bank check is merely a typical example of the type of voucher which is treated in this way.

The bookkeeping device is then laid aside, preferably being filed alphabetically with others of similar character, until it becomes again necessary to make a further entry, at which time the process is repeated. At that time, the new voucher is also inserted into the pocket. Over a period of time, it is obvious that vouchers will be successively accumulated in the pocket, each voucher corresponding to one of the entries on the device. I have indicated by the reference numeral 30 in Figures 6 and 8 a typical accumulated group of vouchers.

When the time arrives for transmitting a statement of account to the customer, the staple 25 or other temporary fastening means is first withdrawn, it being understood that this fastening means is of a temporary character to permit easy removal. The ledger page 11 is then severed from the device along the score line 10, and the duplicating means 24 is also removed. The latter may be used again in a new device, or it may be discarded; but the ledger page is retained and filed by the bank or other concern.

This leaves an assembly of the character illustrated in Figure 7, consisting only of the statement of account and the bundle of accumulated vouchers appertaining to the entries thereon. The statement is then enfolded or wrapped around the pocket, with the accumulated vouchers. One way of accomplishing this is illustrated in Figures 8 and 9. The pocket is first folded up along the fold line 31, and then folded again along the line 32. The end portion 33 of the statement of account is then folded down along the line 34, and finally the sealing flaps 13 are brought into the position of Figure 9 and secured by adhesive or other suitable means.

The resulting unit, shown in Figure 9, is a self-sufficient mailable unit, the statement, itself, serving as a wrapping for the pocket and the accumulated vouchers; and the obverse side of the unit, as shown in Figure 10, being already marked with the name and address of the concern that is placing the unit in the mail.

When the customer receives the unit and opens it he has before him a statement of his account, together with the vouchers justifying the entries on it.

Where the device is used in connection with a department store the vouchers may, for example, constitute sales checks or duplicates of sales checks, and the entries on the statement will show the purchases during a given period together with the balance that is due to the store. The device may, obviously, be used for all sorts of similar transactions, and it will be understood that the invention is by no means restricted to the banking business nor to retail sales or the like.

The advantages of the present device will be obvious to those familiar with bookkeeping procedures of the present general type. Since the vouchers are accumulated successively in physical association with the customer's statement of account, the tedious procedure of sorting, storing, resorting, and assimilating vouchers is completely dispensed with, the likelihood of error being thereby reduced to an absolute minimum. Since the entries on the statement of account are made simultaneously with the entries on the ledger page, there is always an accurate tally between the records kept by the bank or other concern and the record that is sent to the customer. And by virtue of the construction of the present device, the procedure of delivering or mailing the ultimate unit to the customer is of an extremely efficient and simple character.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention and illustrated its use, what I claim as new and desire to secure by Letters Patent is—

1. In a bookkeeping device, a pair of separably associated superposed sheets having duplicating means, the upper sheet having designations for constituting a ledger page, the under sheet having designations for constituting a statement of account, whereby entries made on the ledger page are duplicated upon the statement of account, and a pocket carried by the statement of account and adapted to accommodate the vouchers upon which said entries are based, whereby the ledger page and duplicating means may be removed from the assembly consisting only of the statement of account and the pocket for the vouchers appertaining to the entries thereon.

2. In a bookkeeping device, the combination of elements set forth in claim 1, in which said pocket is secured to the bottom of said statement of account transversely thereof in suspended relation thereto.

3. In a bookkeeping device, the combination of elements set forth in claim 1, in which said pocket is secured to the bottom of said statement of account in suspended relation thereto and has its length extending along the width of the statement of account, said statement of account being long enough to wrap completely around and thereby enfold the pocket and the accommodated vouchers.

4. In a bookkeeping device, a pair of separably associated superposed sheets, a separable duplicating means sandwiched between them, the upper sheet having designations thereon for constituting a ledger page, the under sheet having designations thereon for constituting a statement of account, whereby entries made on the ledger page are duplicated upon the statement of account, a pocket carried by the statement of account and adapted to accommodate the vouchers upon which said entries are based, whereby the ledger page and duplicating means may be removed leaving an assembly consisting only of the statement of account and the pocket for the vouchers appertaining to the entries thereon, said statement of account being large enough to enfold said pocket and the accommodated vouchers, and means for securing said assembly in enfolded condition as a self-sufficient mailable unit.

5. In a bookkeeping device, the combination set forth in claim 4, said last-named means comprising sealing flaps carried by said statement of account, said flaps being normally folded down to lie within the confines of the device between the ledger page and the statement of account.

6. In a bookkeeping device, a pair of separably associated superposed sheets, a separable duplicating means sandwiched between them, the upper sheet having designations thereon for constituting a ledger page, the under sheet having designations thereon for constituting a statement of account, whereby entries made on the ledger page are duplicated upon the statement of account, a pocket carried by the statement of account and extending transversely thereof at the bottom of said sheet in suspended relation thereto, said pocket being adapted to accommodate the vouchers upon which said entries are based, whereby the ledger page and duplicating means may be removed leaving an assembly consisting only of the statement of account and the pocket for the vouchers appertaining to the entries thereon, said statement of account being long enough to wrap completely around and thereby enfold the pocket and the accommodated vouchers, and means for securing said assembly in wrapped enfolded condition as a self-sufficient mailable unit.

7. In a bookkeeping device, the combination set forth in claim 6, said last-named means comprising sealing flaps carried along the upper edges of said statement of account.

8. In a bookkeeping device, the combination of elements set forth in claim 1, in which said ledger page and statement of account are integrally connected along their upper edges.

9. In a bookkeeping device, the combination of elements set forth in claim 1, in which said pocket comprises a front wall and a rear wall, one of said walls being integral with said statement of account.

10. In a bookkeeping device, the combination of elements set forth in claim 1, in which said pocket is suspended from the bottom of said statement of account and comprises a front wall and a rear wall one of which walls is an integral extension of said statement of account.

11. In a bookkeeping device, the combination of elements set forth in claim 1, in which said ledger page and statement of account are integrally connected along their upper edges, and in which said pocket comprises integral front and rear walls one of which is an integral portion of said statement of account.

12. In a bookkeeping device, the combination with the elements set forth in claim 1, of releasable means for temporarily securing the ledger page near its bottom edge to the statement of account.

13. In a bookkeeping device, the combination with the elements set forth in claim 1, of releasable means for temporarily securing the ledger page near its bottom edge to the statement of account, said means also engaging through an edge portion of said pocket and serving to retain said pocket closed along said edge.

14. A bookkeeping device comprising a pair of superposed sheets having duplicating means therebetween, said pair of sheets being detachably joined together at one end thereof, one of said sheets having designations thereon for constituting a ledger page, the other sheet having designations thereon for constituting a statement of account, whereby entries made on the ledger page are duplicated on the statement of account, said statement sheet having the end thereof opposite said joined ends extended beyond the end of the ledger page and folded back upon itself forming a pocket, said pocket extending transversely of the statement sheet with an open end adjacent a side edge of said statement sheet and with the sides of said pocket substantially closed.

15. In a bookkeeping device, a sheet having designations thereon for constituting a statement of account, said sheet having an end thereof folded back upon itself forming a pocket at said end, said pocket being elongated transversely of said sheet with the sides thereof substantially closed and having an open end adjacent a side edge of the sheet for receiving vouchers therein.

ALEXANDER EFRON.